Sept. 2, 1952     T. C. VAN DEGRIFT     2,608,856
UNBALANCE COMPUTER

Filed Nov. 12, 1949     3 Sheets-Sheet 1

Inventor
Thomas C. Van Degrift
By Willits, Helmig & Baillio
Attorneys

Sept. 2, 1952     T. C. VAN DEGRIFT     2,608,856
UNBALANCE COMPUTER

Filed Nov. 12, 1949     3 Sheets-Sheet 2

Inventor
Thomas C. Van Degrift
By Willits, Helwig & Baillio
Attorneys

Sept. 2, 1952  T. C. VAN DEGRIFT  2,608,856
UNBALANCE COMPUTER
Filed Nov. 12, 1949  3 Sheets-Sheet 3

Inventor
Thomas C. Van Degrift
By
Willits, Helmig & Baillio
Attorneys

Patented Sept. 2, 1952

2,608,856

UNITED STATES PATENT OFFICE 2,608,856

UNBALANCE COMPUTER

Thomas C. Van Degrift, Detroit, Mich., assignor to General Motors Corporation, Detroit, Mich., a corporation of Delaware Application November 12, 1949, Serial No. 126,746

6 Claims. (Cl. 73—66)

The present invention relates to a means for dynamically balancing rotating masses. More particularly it relates to a means for computing the amount of metal which must be removed at preselected points along an engine crankshaft to dynamically balance the shaft.

There are a large number of machines for balancing rotors, crankshafts and other rotating masses. Many of these machines determine the angular position and amount of metal to be removed in two fixed transverse planes on the mass. Others of these machines permit the determination of the amount of metal to be removed at points in a single plane at each end of the crankshaft. Due to the irregular shape of crankshafts and other masses of this type, it is quite desirable that metal be removed only at preselected points which are fixed in both longitudinal and angular position. The removal of metal at these points permits balancing of the crankshaft without harm to the shaft and with a minimum of metal removal.

It is therefore an object of the present invention to provide means for computing unbalance at positions fixed in both angular and longitudinal position on the crankshaft.

It is another object of the present invention to provide a computer for use with existing balancing machines capable of computing the amount of metal to be removed at predetermined fixed points to correct the unbalance indicated by the machine.

It is a further object of the present invention to provide a computer capable of calculating the amount of metal to be removed at preselected points so that the total amount of metal removed is sufficient to counterbalance a dynamically unbalanced mass.

Other objects of this invention will become apparent upon reading the specification and inspection of the drawings and will be particularly pointed out in the claims.

Referring to the figures.

Figure 1:
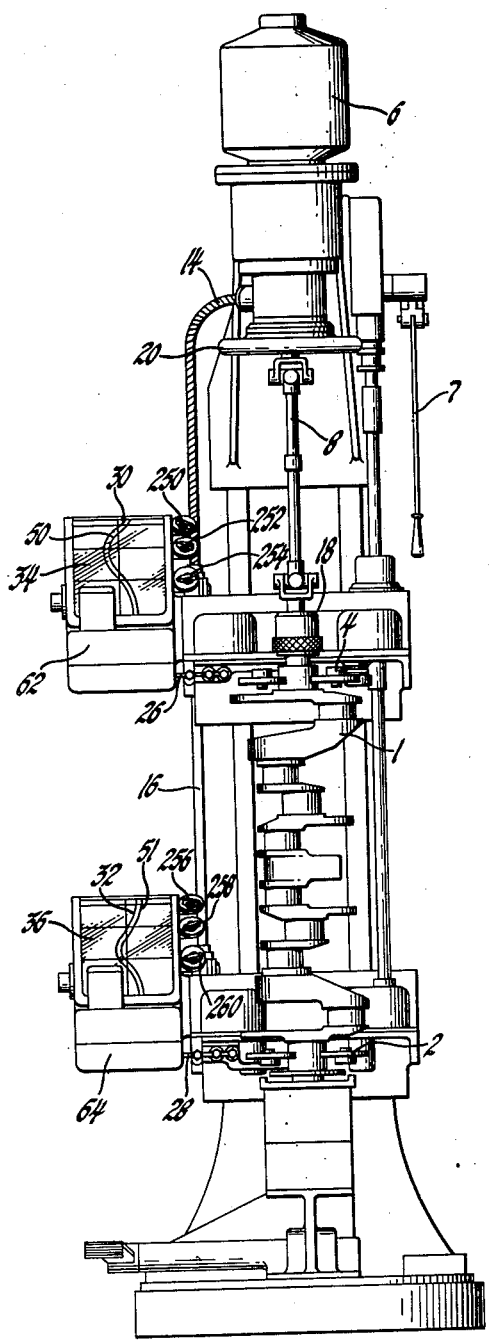
Figure 1 shows the general arrangement of a balancing machine using the present invention.
Figure 2:
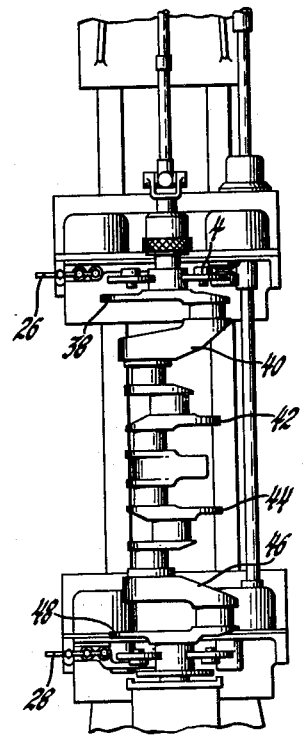
Figure 2 shows the transverse planes selected for metal removal.

Referring more particularly to the figures in the drawings, Figures 1 and 2 illustrate a balancing machine of the general type shown in Patents 1,822,860 Summers and Van Degrift and 2,293,371 Van Degrift but adapted to incorporate the present invention and designed specifically to determine the dynamic unbalance of a six throw crankshaft. The crankshaft 1 is supported by sets of rollers 2 and 4 having limited movement in a plane transverse to the axis of mass rotation. The crankshaft 1 is rotated by the motor 6 through a drive shaft 8. This motor simultaneously drives an octagonal rotatable mirror in the upper indicator 62 and one in the lower indicator 64 through cables 14 and 16. These two indicators are similar in construction and are shown in greater detail in Figures 4 and 6. In order to permit the crankshaft 1 to be substantially free to assume a position of rotating balance, it is suspended from a universal jointed shaft 8 by means of a suitable detachable coupling 18. The shaft 8 is secured to a rotatably mounted shaft driven by suitable means such as electric motor 6. Handwheel 20 is connected to the shaft 8 as shown to permit manual rotation of the crankshaft to any desired angular position. As shown in Figure 1 and disclosed in detail in the said prior Summers and Van Degrift patent, the top and bottom journal portions of the crankshaft 1 engage guide rollers 2 and 4 which allow movement of the shaft resulting from out of balance forces. As in the Summers and Van Degrift disclosure, the levers are employed to directly actuate suitable indicating mechanism as illustrated in greater detail in Figure 4.

This mechanically actuated mechanism indicates the dynamic unbalance of the crankshaft in the transverse planes intercepted by the rollers 2 and 4. This unbalance is indicated by means of linkage including arms 26 and 28 to produce traces 30 and 32 on the screens 34 and 36 respectively.

It is quite desirable in balancing certain rotating masses to remove metal at predetermined locations. The rollers 2 and 4 support the crankshaft on the main bearing journals and therefore it is not possible to remove metal in these planes to effect balancing. The locations are preferably selected on counterbalancing weights and other protruding members. This minimizes the amount of metal it is necessary to remove and also locates the points of removal at places where the mutilation of the member is of no serious consequence. In the case of six-bearing crankshafts, as specifically illustrated in the present application, it is quite desirable to remove the metal in the six transverse planes including points 38, 40, 42, 44, 46 and 48. The metal removed from the points 38, 40 and 42 tends to balance the the unbalance indicated by the tracing 30 on the screen 34 and the metal removed at points 44, 46 and 48 tends to remove the unbalance indicated by the tracing 32 on the screen 36. The points 38, 40 and 42 from which metal is to be removed must be located in radial planes so that not more than two of them may be included in any 180° radial angle.

Figure 3:
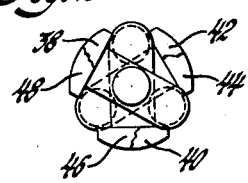
Figure 3 shows the radial planes selected for metal removal.

In Figure 3 the location of these points is shown to be approximately 120° apart. This equiangular location is used on the specific embodiment of the invention herein illustrated for balancing a six-cylinder crankshaft but any other angular displacement may be used so long as the three cannot be included in a 180° angle. The radial displacement of the points 44, 46 and 48 must meet the same requirements as mentioned above in connection with points 38, 40 and 42. Figure 3 also shows the points 38 and 48 as being in a common radial plane, the points 40 and 46 in a common radial plane and a similar relative radial location of points 42 and 44. It is not necessary for the use of the present invention that such a symmetrical arrangement be used. It is only necessary that the signal generator rotors shown in Figure 5 be so located as to coincide with the radial angles of the points selected for metal removal. The amount of metal removed from the above six locations must be so calculated that the summation of their effect on the crankshaft when transferred to the planes containing rollers 2 and 4 equals in magnitude and angular position the unbalance indicated at these points. The traces 30 and 32 as produced by the mechanical linkage indicate the crankshaft unbalance. It is now necessary to remove metal at various points along the crankshaft in such an amount as to counteract or remove this unbalance. The electrical computing mechanism which is used to make these computations is shown more particularly in Figure 5 and will be discussed in connection with that figure. The screens 34 and 36 and the mechanical linkage necessary for producing the traces 30 and 32 are identical with each other and therefore only one of these indicating combinations will be described.

Figure 4:
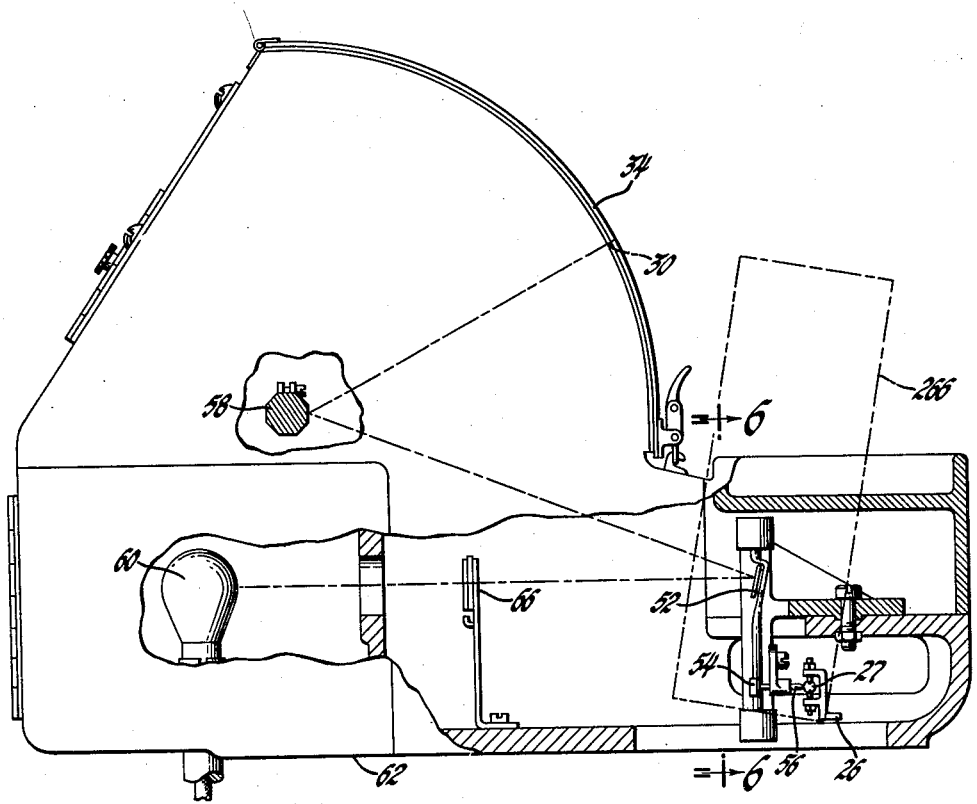
Figure 4 shows the unbalance indicator.

Referring to Figure 4, the mechanism 62 is shown in greater detail. The mechanism 64 is identical with 62 and therefore will not be described in detail. This figure is very similar to Figure 17 of Van Degrift Patent 2,293,371 and illustrates the mechanical means for indicating the dynamic unbalance in the plane of the rollers 4. The rollers 4 are connected to the shaft 26 which in turn is connected to the arm 56 by means of member 27. The arm 56 is connected to the rocker shaft 54 which carries a mirror 52. This mirror is oscillated by movement of the arm 26 so that its angle of oscillation is a direct function of the movement of the unbalanced mass in the plane of the rollers 4. 58 is an octagonal rotatable mirror which is driven by the cable 14. The mirror 58 rotates at one-eighth the speed of the shaft 8 so that one vertical sweep is made across the screen 34 for each revolution of the crankshaft 1. 60 is a source of light focused on the mirror 52 through the filter 66 so that a beam of colored light is caused to scan the rotatable mirror 58 in a horizontal direction as the upper end of the rotating mass 1 oscillates. The rotatable mirror 58 causes the beam to scan the screen 34 in a vertical direction to produce a sine wave 30 whose amplitude is a function of the angle of oscillation of the mirror 52 and thereby a function of the magnitude of the oscillation of the crankshaft in the plane of the rollers 4. This trace 30 is therefore an indication of the unbalance forces set up by mass 1 in the plane containing rollers 4.

In order to determine the amount of metal to be removed at the six preselected points previously mentioned, it is desirable to produce electrical signals dependent upon the mass to be removed at each of the various points and then combine these signals so as to produce a signal identical to the sine wave 30. The circuit for producing this sine wave will be described in detail in connection with Figure 5.

Figure 5:
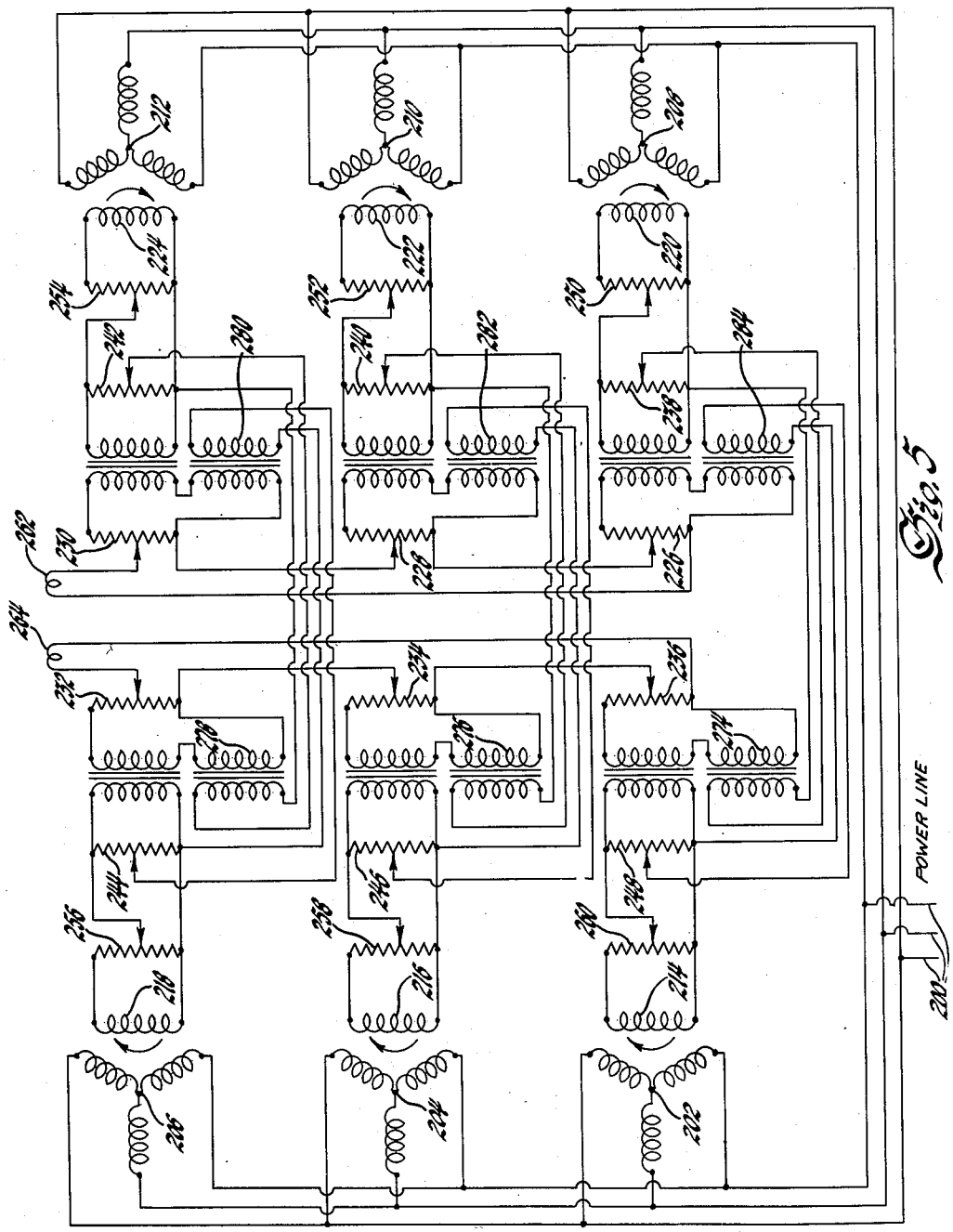
Figure 5 is a circuit arrangement used in the present invention.

Referring to Figure 5, 200 represents a source of three phase electricity whose phase angles are displaced 120 electrical degrees from each other and whose frequency is equal to the rotational frequency of the shaft 1. This three phase signal is fed to the stators 202, 204, 206, 208, 210 and 212 respectively to produce a rotating field in each of these stators coinciding with the rotation of the unbalanced shaft or mass 1. As mentioned earlier it is desirable to produce an electrical signal having a phase angle equal to the radial angle of the corresponding point from which metal is to be removed. In order to produce such signals, the rotors 220, 222, 224, 218, 216 and 214 are set at angles corresponding to the angles of the points 38, 40, 42, 44, 46 and 48 respectively. Each of the rotors carries a pick-up winding which can be manually preset at an angle corresponding to that determined by the radial angle of the point where metal is to be removed. Consequently these rotatable windings respond individually each to a different selected phase and they are so positioned that no more than two of them are included in 180° of radial angle. The effectiveness of removing metal from a rotating mass depends upon the distance the point is located from the center of rotation of the shaft and also the distance of this point from the suspension point of the shaft. It is therefore necessary to use potentiometers 226, 228, 230, 232, 234 and 236 as sensitivity controls. The potentiometers 226, 228 and 230 are adjusted manually to compensate for the location of the points 38, 40 and 42 respectively and the potentiometers 232, 234 and 236 are adjusted to compensate respectively for the location of the points 44, 46 and 48. The potentiometers 226—236 are preset by hand to pick off signals proportional to the longitudinal distance from the fixed point. Consequently the signals are a function of the longitudinal distance of the unbalance point from the end of the body being tested. More metal must be removed from the points 42 or 44 than from the points 38 or 48 to produce the same magnitude of balancing force at the rollers 4 and 2 respectively. Therefore the amount of signal picked off at the potentiometers 230 and 232 is much less than the signal picked off by the potentiometers 226 and 236 respectively. These potentiometers are preset for a particular type of rotating mass and in the particular case here illustrated, the mass is a six-throw six-cylinder internal combustion engine crankshaft.

It is well-known in the balancing art that dynamic unbalance of one end of a rotating shaft causes an apparent unbalance force to appear at the other end of the shaft due to the gyratory action of the rotating shaft about a nodal point. This action and a mechanical means for compensating for same is shown in the above mentioned Van Degrift Patent 2,293,371. In the present instance it is desirable to modify the electrical signals produced by the rotors 214 through 224 by means of a feedback circuit to make this same compensation. The compensation signal necessary is a function of the unbalance and the distance of this unbalance from the nodal point and therefore it permits a quite simple preset adjustment. The correction for this gyratory or nodal point action is permitted by adjustable potentiometers 238, 240, 242, 244, 246 and 248. These potentiometers are preset manually to correspond to the distance of each corrected cheek from the nodal point of the article under test. This nodal point is a function of the mass distribution of the body under test. The percentage of signal to be fed back therefore does not vary with degree of unbalance but varies with the weight distribution of the object to be balanced. For this reason the potentiometers 238 through 248 may be preset and do not need to be varied during balancing of similar objects. Potentiometers 250, 252, 254, 256, 258 and 260 may be graduated in mass to be removed or drill depth or have any other convenient graduations. The holes drilled to compensate for unbalance are located at points where metal can be removed without affecting the body adversely and their extent is determined by the amount of metal which must be removed in order to produce balance. The compensating effect is opposed to the signal which is directly representative of the force at a selected cheek. It may therefore be seen that this circuit produces output signals at the coils 262 and 264 which are equal in amplitude and phase to the mechanical signal produced at the points 4 and 2 respectively. These two coils are identical and their associated circuits are similar. The indicating mirror system as will be described in connection with Figure 6 for coil 262 is identical to the system associated with the coil 264 and the system associated with this latter coil will therefore not be described in detail.

Figure 6:
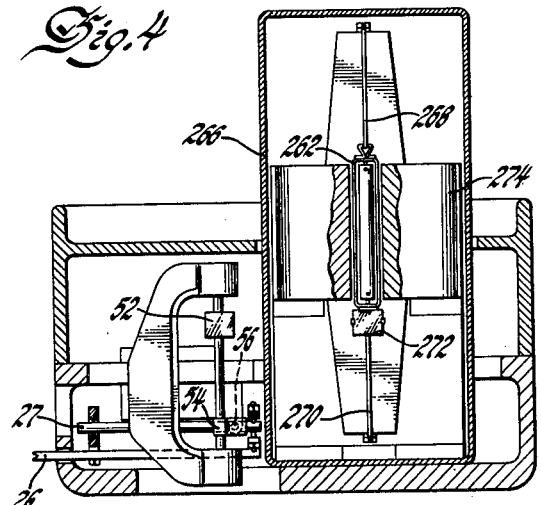
Figure 6 shows the electrical signal indicating means.

Referring now more particularly to Figure 6, the coil 262 is suspended in the casing 266 by means of torsion members 268 and 270. These torsion members may be very fine steel wire or other material having high torsional elasticity. The coil is mounted in the field of a permanent magnet 274 and has rigidly attached thereto a mirror 272. This mirror is located in the same horizontal plane as the mirror 52 and uses a common light source 60 for illumination. When the coil 262 is energized by an electrical current of alternating potential, it oscillates at an angle and frequency dependent upon the magnitude and frequency of the alternations. As mentioned above the frequency of the electrical current used in the circuit illustrated in Figure 5 is identical to the mechanical rotational frequency of the shaft 1. For this reason the frequency of oscillation of the mirrors 52 and 272 is identical. The mirror 272 utilizes the rotatable mirror 58 to obtain vertical scanning on the screen 34 to produce a trace 50. It may therefore be seen that by proper phasing of the current used to energize the coil 262, the trace 50 may be made to be parallel to or coincide with the trace 30 which latter trace is produced by mechanical means.

Preset adjustment

Let's assume for example that it is desired to effect the dynamic balancing of a six-throw crankshaft for a six-cylinder four-cycle internal combustion engine of the automotive type. Such a crankshaft is illustrated in Figures 1 and 2 as 1. Points are then selected along the crankshaft for the removal of metal to permit the balancing thereof. These points may conveniently lie in transverse planes including the crankshaft cheeks such as are illustrated for points 38, 40, 42, 44, 46 and 48. They are located at points where removal of metal will not affect either the strength or the rigidity of the crankshaft. The drill holes consequently have fixed locations determined by the contour of the body under test. Such a crankshaft is symmetrical and therefore the angular position of the point 38 will coincide with that of point 48, the angular position of point 40 will coincide with that of the point 46 and the point 42 will be in the same radial plane as the point 44. It is convenient to resiliently support such a crankshaft at its end main bearing journals, for example, by sets of rollers 2 and 4 respectively. The balancing effect of removing metal depends upon the longitudinal, angular and radial position of the point of removal. Having selected the points from which to remove metal, it is now necessary to transfer the effect at each of the balancing points to two conveniently located transverse planes. The planes including the rollers 2 and 4 respectively are selected as a matter of convenience. Having thus selected the points for metal removal and the planes to which the effect of this removal will be transferred, it is then necessary to set up the computer shown in Figure 5 to operate with this preselected set of conditions. In balancing such a crankshaft a means is provided for rotating the shaft at a convenient speed so as to mechanically determine the shaft unbalance in the planes including the rollers 2 and 4 respectively and producing simultaneously therewith, by means of an electrical computing circuit and signal source, an electrical rebalance signal which exactly matches the mechanical unbalance signal secured by rotating the crankshaft in its resilient mounts. In order to manufacture such a matching signal, a computer and signal source such as shown in Figure 5 is utilized.

Referring to Figure 5, a power source 200 producing a three-phase signal of frequency equal to the rotational frequency of the crankshaft supplies this signal to each of the stators 208, 210, 212, 206, 204 and 202. The rotors 220, 222, 224, 218, 216 and 214 are then adjusted to coincide with the angular positions of the points 38, 40, 42, 44, 46 and 48 respectively. There is thus produced across the potentiometers 250, 252, 254, 256, 258 and 260 signals having a phase angle coinciding with the radial angle of the points 38, 40, 42, 44, 46 and 48 respectively. The removal of metal at the points near the longitudinal center of the shaft produces less balancing force at the end of the shaft closer thereto than does the removal of metal nearer that end of the shaft. The removal of metal, for example, at the longitudinal center of the shaft would divide its force equally between the two ends of the shaft and therefore have only one-half the effect at one end as removing the metal at that end. Therefore a means must be provided for calculating the effect that the metal removed at a preselected point in the shaft will have on each end of the shaft and the electrical signal produced across the above mentioned potentiometers modified to the extent necessary. The potentiometers 226, 228 and 230 are adjusted so that the coil 262 will indicate the balancing effect at the rollers 4 produced by removing metal at the points 38, 40 and 42 respectively. The potentiometers 232, 234 and 236 are so adjusted as to cause the coil 264 to indicate the balancing effect at the rollers 2 caused by removing metal at the points 44, 46 and 48 respectively. It is also necessary to provide electrical means for energizing the coils 262 and 264 so as to indicate the effect on the opposite end of the shaft caused by removal of metals at the above mentioned points. In order to produce such an effect a feedback circuit is provided with a transformer coupling arrangement. Transformers 274, 276, 278, 280, 282 and 284 provide for feedback from the potentiometers 238, 240, 242, 244, 246 and 248 to thereby indicate at the opposite end of the shaft the effect of removing metal at the points 38, 40, 42, 44, 46 and 48 respectively. The potentiometers 238, 240, 242, 244, 246 and 248 are adjusted to give the proper magnitude of this reflected or fed back signal. The adjustment of the potentiometers 226 through 248 is made during a setting up of the computer for a particular mass to be balanced by metal removal at particular points. The potentiometers 250, 252, 254, 256, 258 and 260 are graduated in terms of drill depth or any convenient graduations so as to indicate the specific amount of metal removal at the points 38, 40, 42, 44, 46 and 48 respectively.

*Operation*

Having thus set up the machine a crankshaft 1 is placed therein and coupled to the motor 6 by means of shaft 8 and coupling 10. The operator then moves the lever 7 starting the motor 6 and the crankshaft is brought up to speed. If the shaft is dynamically unbalanced the rollers 4 and 2 will oscillate thus giving the shafts 26 and 28 a reciprocating motion proportional in amplitude to the magnitude of the unbalance at the planes including the rollers 4 and 2 respectively.

Referring to Figure 4, the movement of the shaft 26 through the connecting linkage will cause the mirror 52 to oscillate through an angle dependent upon the unbalance at a plane including the rollers 4. Light is projected from the source 60 through the filter 66 onto this mirror 52 and thence onto the rotating mirror 58 so as to produce a colored trace 30 on the screen 34. This trace is a sine wave whose amplitude is a function of the unbalance.

The movement of the rollers 2 caused by unbalance at the bottom of the shaft reciprocates the shaft 28 and in a similar manner produces a colored trace 32 on the screen 36. This trace 32 is another sine wave whose amplitude is a function of the unbalance in a transverse plane including the rollers 2. The operator now has an indication of the unbalance at both the upper and lower ends of the crankshaft. The operator then adjusts the potentiometers 250, 252, 254, 256, 258 and 260 to produce a trace 50 on the screen 34 which coincides with the trace 30 and to produce a trace 51 which matches exactly with the mechanically produced trace 32 on the screen 34. Since there is interaction between the two circuits, the operator may be forced to readjust the potentiometers. In balancing any particular shaft the operator will only have to adjust two of the upper potentiometers and two of the lower potentiometers. The operator may easily determine which of the potentiometers not to adjust by watching the trace during adjustment. One of the three potentiometers will cause the mismatch between the electrically produced trace and the mechanically produced trace to increase and of course should not be used. After the traces 30 and 50 and the traces 32 and 51 are matched, the operator may then read the graduations on these potentiometers and the indicated metal may be removed in a separate operation.

Although I have described the invention with specific reference to a particular embodiment thereof, certain changes may be made without departing from the scope of the invention, for example, it may be desirable to read the mechanically determined unbalance in amplitude and phase angle noting this in the proper manner. The coils 262 and 264 may be replaced by a meter of the general type of that disclosed in the patent to Antranikian, No. 2,005,962, dated June 25, 1935, reading amplitude and phase angle and the computer located remotely from the balancing machine and used merely as a computing mechanism to determine the metal to be removed to balance the shaft. In such a case the operator adjusts the potentiometers 250 through 260 so that the meters replacing the coils 262 and 264 read the unbalance in amplitude and phase angle which was previously indicated by the mechanically actuated balancing machine.

Other modification may be made such as connecting the potentiometers 250 through 260 directly to drill setting apparatus by means of any of the well-known telemetering devices and thus eliminate the necessity of reading graduations.

The invention above described is intended to be limited only by the limitations contained in the following claims.

I claim:

1. Apparatus for determining the metal to be removed to balance a rotating elongated dynamically unbalanced mass including; means for indicating the unbalance of the mass in magnitude and radial direction at two arbitrarily longitudinally spaced transverse planes, means for matching the indicated unbalance in the two arbitrary planes, said last named means including means for producing a plurality of signals corresponding in phase and proportional in magnitude to the balancing force which would be produced by metal removal at preselected points on the mass, and means for combining these signals so as to produce an indication matching said indicated unbalance to thereby determine the amount of metal to be removed at the various preselected points.

2. Apparatus for determining the unbalance of a rotating elongated mass as claimed in claim 1 in which means is provided for compensating the balancing signals for the oscillation of said mass about its nodal point.

3. Apparatus for determining the unbalance of a rotating elongated mass as claimed in claim 1 in which metal is removed at six preselected points lying in six planes transverse to the axis of rotation, three of said points lying on each side of the transverse center line of said rotating mass, each of said three points being radially displaced from each other by angles greater than 90°.

4. Apparatus for determining the unbalance of a rotating elongated mass as claimed in claim 1 in which metal is removed at six preselected points located in three 120° displaced radial planes.

5. In a computer for determining weight to be removed for balancing rotatable members, means to determine the amount of material to be removed at points preselected in phase, longitudinal displacement and radial displacement including; electrical means capable of generating signals proportional to the counterbalancing couple introduced by removing metal at the preselected points, means for adjusting the magnitude of these signals proportional to the weight of metal to be removed, and means for combining these adjusted signals to produce a signal equal in phase and proportional in magnitude to the couple set up by the total unbalance of said shaft to thereby determine the amount of metal to be removed at the various preselected points.

6. Apparatus for analyzing the unbalance of an elongated rotatable body into a plurality of forces at preselected points fixed in both radial and longitudinal location including; means for resiliently supporting the rotatable body in two fixed spaced transverse planes, means to indicate the dynamic unbalance of said body at each of these two spaced planes, means for producing an electrical signal of the same phase angle and magnitude as that of the indicated dynamic unbalance, said means including means for producing electrical signals of the same phase angle as the unbalancing force of mass at the preselected points respectively, means for combining these signals to produce the first mentioned signal and means for indicating the magnitude of each of these signals to thereby indicate the weight of the metal to be removed at the various preselected points to obtain balance.

THOMAS C. VAN DEGRIFT.

REFERENCES CITED

The following references are of record in the file of this patent:

UNITED STATES PATENTS

| Number | Name | Date |
|---|---|---|
| 1,515,034 | Griswold | Nov. 11, 1924 |
| 1,639,444 | Terry | Aug. 16, 1927 |
| 1,822,860 | Summers et al. | Sept. 8, 1931 |
| 2,293,371 | Van Degrift | Aug. 18, 1942 |

FOREIGN PATENTS

| Number | Country | Date |
|---|---|---|
| 583,728 | Germany | Sept. 8, 1933 |